United States Patent
Nguyen et al.

(10) Patent No.: US 7,392,519 B2
(45) Date of Patent: Jun. 24, 2008

(54) LOCALIZATION CATALOGUING TOOL

(75) Inventors: Liem Manh Nguyen, Roseville, CA (US); Thomas Vachuska, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 843 days.

(21) Appl. No.: 10/667,525

(22) Filed: Sep. 23, 2003

(65) Prior Publication Data

US 2005/0066316 A1    Mar. 24, 2005

(51) Int. Cl.
 *G06F 9/44* (2006.01)
(52) U.S. Cl. .......................... 717/170; 717/171; 704/8; 704/9; 704/10
(58) Field of Classification Search ................ 717/100, 717/136, 137, 168–178; 710/62–65; 719/328, 719/329; 709/203, 219; 704/8–10
See application file for complete search history.

(56) References Cited

U.S. PATENT DOCUMENTS

| | | | | |
|---|---|---|---|---|
| 5,551,055 A | * | 8/1996 | Matheny et al. | 710/62 |
| 5,664,206 A | * | 9/1997 | Murow et al. | 704/8 |
| 5,900,871 A | * | 5/1999 | Atkin et al. | 715/866 |
| 5,907,326 A | * | 5/1999 | Atkin et al. | 715/866 |
| 6,122,658 A | * | 9/2000 | Chaddha | 709/203 |
| 6,275,790 B1 | * | 8/2001 | Yamamoto et al. | 704/8 |
| 6,275,978 B1 | * | 8/2001 | Bell | 717/143 |
| 6,311,151 B1 | * | 10/2001 | Yamamoto et al. | 704/8 |
| 6,397,232 B1 | * | 5/2002 | Cheng-Hung et al. | 715/523 |
| 6,425,123 B1 | * | 7/2002 | Rojas et al. | 717/136 |
| 6,453,462 B1 | * | 9/2002 | Meade et al. | 717/124 |
| 6,490,547 B1 | * | 12/2002 | Atkin et al. | 704/8 |
| 6,507,812 B1 | * | 1/2003 | Meade et al. | 704/8 |
| 6,623,529 B1 | * | 9/2003 | Lakritz | 715/536 |
| 6,735,759 B1 | * | 5/2004 | Yamamoto et al. | 717/136 |
| 6,810,429 B1 | * | 10/2004 | Walsh et al. | 709/246 |
| 6,938,259 B2 | * | 8/2005 | McGeorge, Jr. | 719/313 |
| 7,110,937 B1 | * | 9/2006 | Lei et al. | 704/2 |
| 7,149,964 B1 | * | 12/2006 | Cottrille et al. | 715/513 |
| 2003/0126559 A1 | * | 7/2003 | Fuhrmann | 715/513 |
| 2005/0015439 A1 | * | 1/2005 | Balaji et al. | 709/203 |

OTHER PUBLICATIONS

Forte Programming Guide, Release 3, Forte Software, 1998, Chapter 15.*

* cited by examiner

*Primary Examiner*—Todd Ingberg

(57) ABSTRACT

A code arrangement for facilitating the localization of an information source comprising a collector module for collecting information units to be localized from the information source and for causing a copy of the information units to be localized, a synchronization module for receiving the localized information units and comparing each to a current version of the information unit from the information source to determine if the information unit has changed and a dispersing module for storing the localized information unit if the information unit is unchanged. A related processor and method may include features similar to the elements of the code arrangement.

19 Claims, 2 Drawing Sheets

LOCALIZATION CATALOGUING TOOL

BACKGROUND OF THE INVENTION

Software developers typically design software using English as a standard language for user interaction. Software developers face an increasingly challenging task of making the same software usable to different users around the world. To accomplish this, software should be adaptable to regional differences such as language, customs, formats, currencies, etc. Localization involves making software configurable to the region, language or other characteristic.

A localization process broadly involves separating the language or region specific information into a locale file or data-store. Thereafter, either in-house or third party language translators prepare sets of language or region specific locales. The localization process builds a set of locales that are included in the software. When the user executes the software, he or she selects the region or other characteristics to adapt the software. Based on this selection, the software uses an appropriate pre-build and includes locale data for user interaction. Thus, different users around the world with varying requirements can use the same software package in a similar manner.

A typical modern software application may include a set of program files, data files and image files. Localization efforts generally focus on the application elements or properties such as interaction text, menus, labels, error messages, prompts, images, etc., that require the software to adapt to a user desired interface.

A localization process requires inputs from translators who translate messages to build locale-specific information. The translators may be either in-house, user supplied or external agencies. Software developers should work in tandem with translators. However, it may be a challenging task to coordinate the original information and translated information. For example, developers may be making changes to software while the translation process is in progress. Further, the development and translation cycle may undergo several iterations including correction and checking. It can be an arduous task to manually catalogue, i.e., manually synchronize the software development cycle with the localization cycle.

A known technique of cataloguing allows searching of image files using tracking text files similar to JAVA's PropertyResourceBundle. However, this approach suffers from the having to link the image files and text-files that track the image files.

SUMMARY OF THE INVENTION

One of the embodiments of the invention is directed to a code arrangement for facilitating the localization of an information source. Such a code arrangement may include a collector module for collecting information units to be localized from the information source and for causing a copy of the information units to be localized, a synchronization module for receiving the localized information units and comparing each to a current version of the information unit from the information source to determine if the information unit has changed and a dispersing module for storing the localized information unit if the information unit is unchanged.

Further areas of applicability of the invention will become apparent from the detailed description provided hereinafter. It should be understood that the detailed description and specific examples, while indicating the embodiments of the invention, are intended for purposes of illustration only and are not intended to limit the scope of the invention.

BRIEF DESCRIPTION OF THE DRAWINGS

The invention will become more fully understood from the detailed description and the accompanying drawings, wherein.

DETAILED DESCRIPTION OF EXEMPLARY EMBODIMENTS

The following description of embodiments is merely exemplary in nature and is in no way intended to limit the invention, its application, or uses.

Embodiments of the invention provide a tool to track and coordinate the translation process of developed software modules to provide accurate software localization. An example is a developed software module is the storage area manager (SAM) of a storage area network (SAN).

Figure 1:
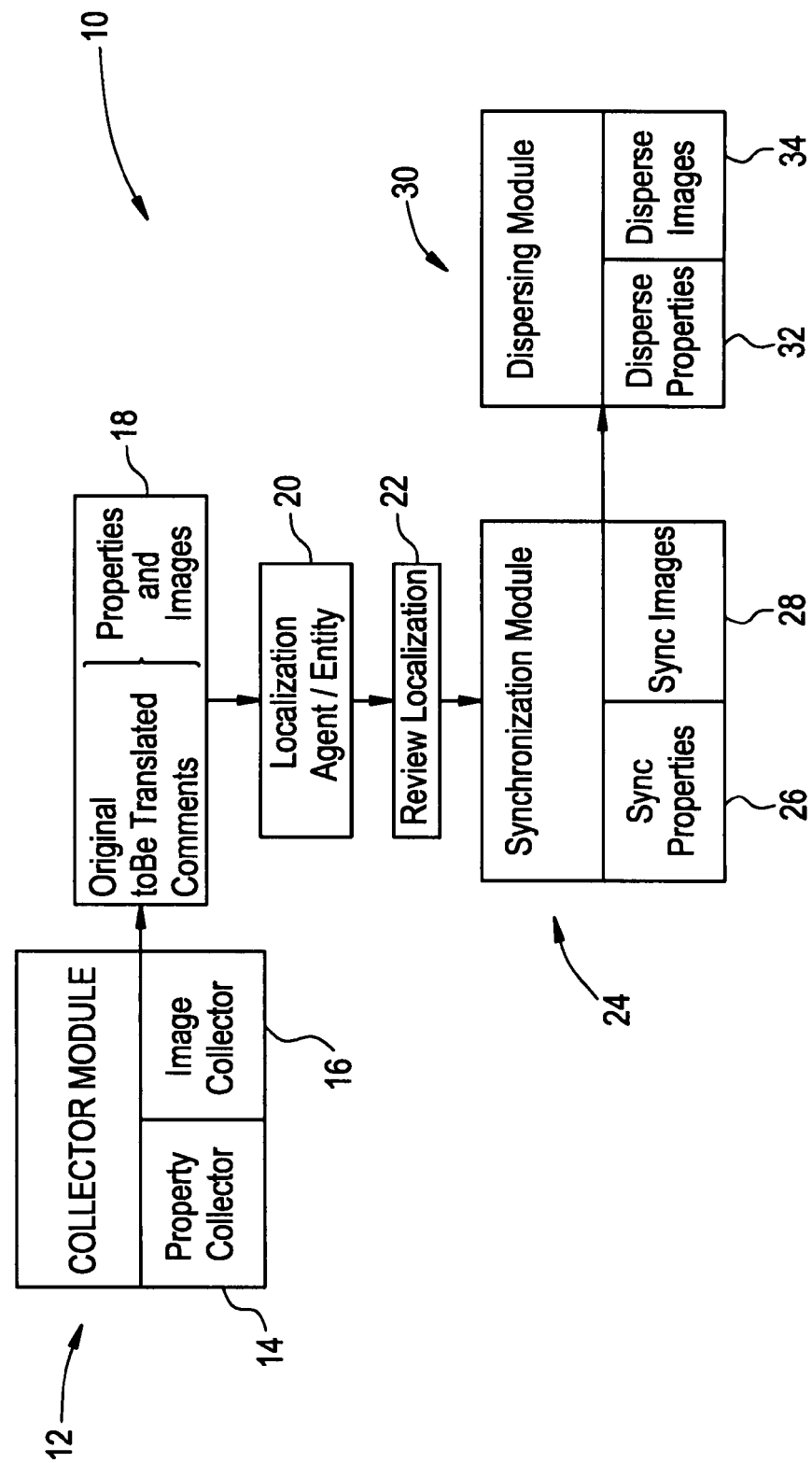
FIG. 1 is a block-diagram of a cataloguing tool according to an embodiment of the invention.

FIG. 1 is a block-diagram of a cataloguing system 10 according to an embodiment of the invention. Such a cataloguing system 10 collects the non-localized information and causes it to be localized. The cataloguing system 10 may also synchronize or update the localized information with subsequent as-yet un-localized changes or updates to the corresponding non-localized information. The existence of un-localized changes or updates can occur due to translation latencies. Cataloguing system 10 includes a collector module 12 which collects an information source to be localized. An information source may be a software application, a text document, an image file, or any other information that can be localized. According to an embodiment, the cataloguing system 10 is implemented with JAVA-based software.

In JAVA environments, properties to be localized can be organized into locales. Each locale corresponds to either a separate language, format or other distinguishing feature. A locale can also combine multiple distinguishing features to form a new locale. A locale file holds the information necessary to customize the software for that locale. Those skilled in the art will understand that JAVA is used here as a representative language and other languages could also be utilized as would be known to one of ordinary skill in the art, such a C, C++, or other object-oriented programming languages.

Collector module 12 includes a property collector 14 and an image collector 16. Property collector 14 collects original properties that are to be localized. Similarly, image collector 16 collects images that are to be localized. Collector module 12 sends the original and to-be-translated properties and images along with any comments in a collected packet 18 to a localization agent (or entity) 20. As an example, the collector module 12 is shown as handling images and properties. Those skilled in the art would know that images and properties are merely examples of types of information units that can be handled by the invention, and the same do not limit the invention in any manner. The operation of the collector module 12 is illustrated by the following example. In the example, it is assumed that two resource files containing properties are named as "Resource1.properties" and "Resource2.properties". Inside these resource files properties are key/value pairs for both text messages and gif/jpeg resources. A key is any information unit that can be localized. Using the appropriate instructions, the key can be translated into its value(s). The collector module 12 gathers the unique key/value pairs in these resources and puts them in a master catalogue. The collector module 12 also stores/ notes the location of the properties files "Resource1.properties" and "Resource2.properties", where each key/value pair originates. These stored locations are to used to disperse the translated key/value pairs back into their corresponding properties files as described below.

Localization entity 20 can be an external party, client-supplied service, automatic software application or the developer-written software. Further, a software program can also perform a translation or conversion process to localize properties and images. Those skilled in the art would appreciate that the nature of the entity performing the localization does not affect the invention, and hence any localization entity can be used in other embodiments of the invention.

A review of the localization is performed by a review localization entity 22. Review ensures that localization process has fulfilled the requirements of the development cycle.

A synchronization module 24 ensures that the current localization iteration has properly been performed as per any requirements imposed by the development cycle. Synchronization module 24 receives the collected packet 18 and synchronizes the to-be-translated properties and images with the localized properties and images generated by the localization entity 20 and reviewed by the review localization entity 22. Properties are synchronized by a property synchronizer 26, and the images are synchronized by an image synchronizer 28. Synchronization module 24 calls the collector module 12 to generate a new catalog and compare the new catalog with an existing catalog. If the two catalogs are different, the collector module 12 generates a delta catalog. Dispersing module 30 distributes the localized properties and image files to the original locale files where the localization information is to be stored. Within the dispersing module 30, a property disperser 32 disperses properties, while a image disperser 34 disperses images. Dispersing module 30 refers back to the original catalogs and for each key/value pair, will examine what properties file has those values, and then creates the localized properties file. The interaction of the collector module 12, the synchronization module 24, and the dispersing module 30 is described in more detail in conjunction with FIG. 2.

Those skilled in the art will appreciate that the catalogues can be stored in various types of data-stores. For example, flat files, native databases, or relational databases may also be used, either singly, or in combination. The catalogues can be stored in any storage capable of storing string/text/image data.

Cataloguing as described in the above embodiment of the invention reduces conflicts between the original and the localized version of a software element. In the absence of cataloguing, a member of a development team or some other person would have to individually verify if all selected elements were properly localized or not. Further, the development team member would have to verify if all the images and properties in the localized version of the software are synchronized with the current version of the software which can include changes made by the development team. Manually performing this process would be error-prone and lead to incorrect localization. Thus, the cataloguing tool described above is error-reducing and provides a less expensive tool for managing the localization process.

An example described below will illustrate the above arrangement in the context of a properties file. In this example, it is assumed that previously the property collector 14 of the collector module 12 collects the original properties file to be translated and sends it to the localization entity 20 as a master catalog. It is possible that a developer will make a change to a given properties file while the localization entity 20 was still localizing the master catalog, The synchronization module 24 through its property synchronizer 26 may automatically generate a smaller version of the master catalog containing only the properties that were changed while the localization process was being performed on the master catalog. The smaller version of the master catalog may be resent to the localization entity 20 for further localization. This process may be iterated until the master catalog is updated and synchronized with the catalog requirements of the development cycle.

Figure 2:
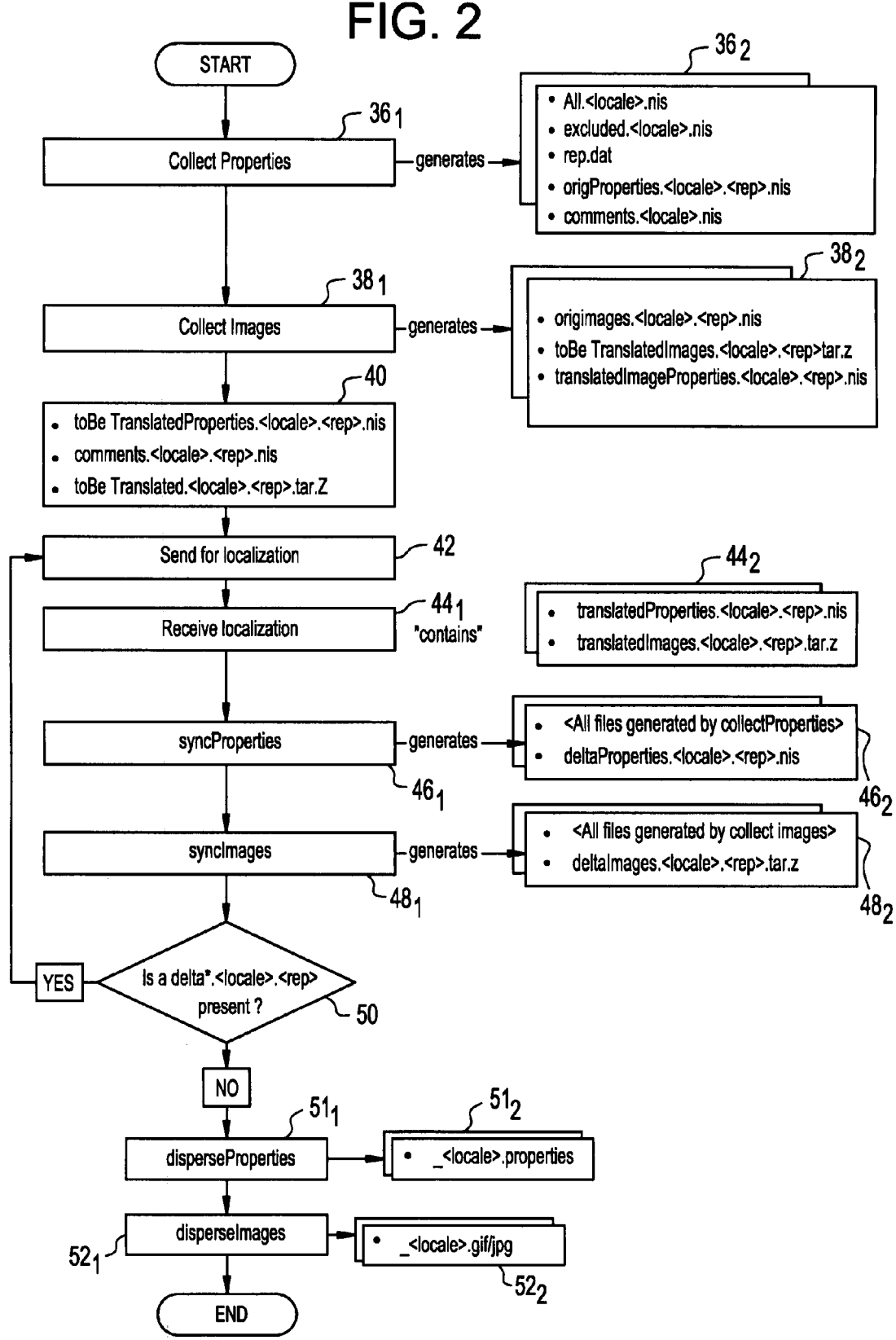
FIG. 2 shows a flow-chart of another cataloguing tool according to an embodiment of the invention.

FIG. 2 shows a flow-chart for cataloguing according to another embodiment of the invention. In an embodiment of the invention, the localization process can be iterated along with the synchronization process to provide localization of properties and images. At step $36_1$ the property collector 14 collects the properties to be localized. The property collector 14 generates information $36_2$ regarding original properties and comments. At step $38_1$, the image collector 16 collects the images to be localized. The image collector 16 generates information $38_2$ regarding the original images, images to be translated and the properties of translated images. What the collector module 12 produces is two "catalogues" to be translated (one for text—toBeTranslatedProperties.<locale>.<rep>.nls and one for images—toBeTranslatedImages.<locale>.<rep>.tar.Z). The text "catalogue" is a consolidation of unique key/value pairs. In other words, duplicate key/value pairs that exist throughout the product are presented in the catalogue as a single key/value pair to avoid redundant translation and reduce translation cost. Similarly, the image "catalogue" uses file checksums to uniquely identify images throughout the product to further reduce cost. These catalogues are then sent to the localization entity to be localized. Although the catalogues are not direct copies of the original information units, they are representative of the original information units. From these catalogues, the original set of information units can be recreated.

At step 40, the generated properties to be translated, optional comments and locale for storing the translated material are supplied to the localization entity 20. The localization entity 20 performs localization at step 42. Translation is an example of a localization process according to an embodiment of the invention. For images, the translation process may involve creation of graphics/image files, e.g. GIF or JPEG, with translated text and/or symbols. Those skilled in the art will understand that translation is representative of the localization process, and other localization activities could also be performed (such as data format conversions), either alone or in combination, as would be known to one of ordinary skill in the art. The localization results are received at step $44_1$ and include the translated properties and translated images $44_2$ generated by the localization entity 20.

Property synchronizer 26 generates a difference, if any, between the original collected properties and the localized properties at step $46_1$. The property synchronizer 26 operates on a principle that is generally similar to a "diff" utility, since "diff" also searches for differences in files. The difference, if any, may be generated as "deltaProperties" $46_2$. Similarly, images are synchronized at step $48_1$ and "deltaImages" $48_2$ may be generated representing the difference between the original collected images and the synchronized images. The image synchronizer 28 (shown in FIG. 1) can be used to synchronize images. The image synchronization process may utilize a "diff"-like key/value based difference searching in addition to a cyclic redundancy code (CRC) checksum.

Once the catalogues (toBeTranslated*) get to the localization entity, the localization entity will in effect make a copy of these catalogues and provide in addition to the original information, the localized (i.e., German, etc.) values to the English key/value pairs. These copies are the translatedProperties.<locale>.<rep>.nls and the translatedImages.<locale>.<rep>.tar.Z files. As mentioned earlier, these catalogues with the additional translation information can be used to recreate the information units, but, this time, with the appropriate translations. Either or both the synch module 24 and the dispersing module 30 may have this capability.

Those skilled in the art will appreciate that the image and property synchronization processes described above can use additional techniques to achieve synchronization. For example, custom error correcting codes can be used to track differences between images or properties.

The presence of a delta (indicating a difference) is checked at step 50. If a delta is present, then the localization and synchronization process is iterated again from step 42 through steps 48$_1$ until there is no delta. If no delta is present, then the dispersing module 30 disperses the properties 51$_2$ and images 52$_2$ as shown at steps 51 and 52.

The above described embodiment may entail repeated localization and synchronization until desired level of accuracy is achieved.

Properties and images are two broad categories of localization candidates considered above. Those skilled in the art will understand that properties and images are representative of the items that may be localized, and other items could also be localized, either alone or in combination, as would be known to one of ordinary skill in the art. Any other software elements can also be catalogued in addition to properties and images. Cataloguing such properties and images helps in managing the localization process as described in detail above.

It is noted that the functional blocks illustrated in FIGS. 1-2 may be implemented in hardware and/or software. The hardware/software implementations may include a combination of processor(s) and article(s) of manufacture. The article(s) of manufacture may further include machine readable media and executable computer program(s). The executable computer program(s) may include machine readable instructions to perform the described operations. The computer executable program(s) may also be provided as part of externally supplied propagated signal(s) either with or without carrier wave(s)

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A machine-readable medium having code portions embodied thereon that, when read by a machine, cause said processor to facilitate the localization of an information source, the code portions comprising:

a collector module for collecting information units to be localized from the information source and for causing a copy of the information units to be localized;

a synchronization module for receiving the localized information units and comparing each to a current version of the information unit from the information source to determine if the information unit has changed, wherein the synchronization module causes the localized information units to be discarded and relocalized if the information unit has changed; and a dispersing module for storing the localized information unit if the information unit is unchanged.

2. The computer-readable medium of claim 1, said synchronization module resending any information units having a changed state to a localization entity, the localization entity converting the information units to a localized state by applying a localization process, said synchronization module resynchronizing any information units received from the localization entity.

3. The computer-readable medium of claim 1, wherein the information unit is at least one of a property and an image.

4. The computer-readable medium of claim 3, said collector module including at least one of:

an image collector for collecting said image; and a property collector for collection said property.

5. The computer-readable medium of claim 3, said synchronization module including at least one of:

an image synchronizer for synchronizing said image; and a property synchronizer for synchronizing said property.

6. The computer-readable medium of claim 3, said dispersing module including at least one of:

an image disperser for storing said image; and a property disperser for storing said property.

7. The computer-readable medium of claim 1, said synchronization module synchronizing by determining differences between each localized information unit and the current version of the information unit from the information source.

8. A processor for facilitating the localization of an information source comprising:

a collector module for collecting information units to be localized from the information source and for causing a copy of the information units to be localized;

a synchronization module for receiving the localized information units and comparing each to a current version of the information unit from the information source to determine if the information unit has changed, wherein the synchronization module causes the localized information units to be discarded and relocalized if the information unit has changed; and a dispersing module for storing the localized information unit if the information unit is unchanged.

9. The processor of claim 8, said synchronization module resending any information units having a changed state to a localization entity, the localization entity converting the information units to a localized state by applying a localization process, said synchronization module resynchronizing any information units received from the localization entity.

10. The processor of claim 8, wherein said information unit is at least one of a property and an image.

11. The processor of claim 10, said collector module including at least one of:

an image collector for collecting said image; and a property collector for collection said property.

12. The processor of claim 10, said synchronization module including at least one of:

an image synchronizer for synchronizing said image; and a property synchronizer for synchronizing said property.

13. The processor of claim 10, said dispersing module including at least one of:

an image disperser for storing said image; and a property disperser for storing said property.

14. The processor of claim 8, said synchronization module synchronizing by determining differences between each localized information unit and the current version of the information unit from the information source.

15. A method for facilitating the localization of an information source comprising:

collecting information units to be localized from the information source and for causing a copy of the information units to be localized;

receiving the localized information units and comparing each to a current version of the information unit from the information source to determine if the information unit has changed;

discarding and relocalizing the localized information units if the information unit has changed; and storing the localized information unit if the information unit is unchanged.

16. The method of claim 15, wherein any information units having a changed state are resent to a localization entity, the localization entity converting the information units to a localized state by applying a localization process, said method resynchronizing any information units received from the localization entity.

17. The method of claim 15, wherein said information unit is at least one of a property and an image.

18. An apparatus operable to perform the method of claim 15.

19. A computer-readable medium having code portions embodied thereon that, when read by a processor, cause said processor to perform the method of claim 15.

\* \* \* \* \*